June 26, 1956  J. P. YOUNG  2,752,207
TOOL AND APPLIANCE HANDLE
Filed Nov. 12, 1952
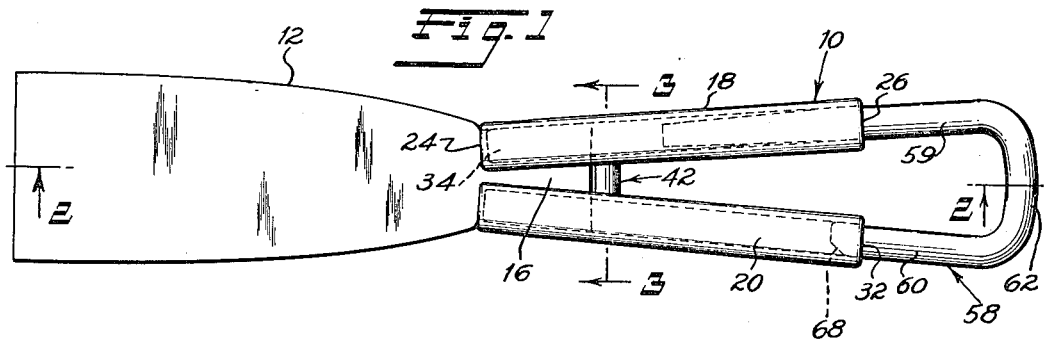
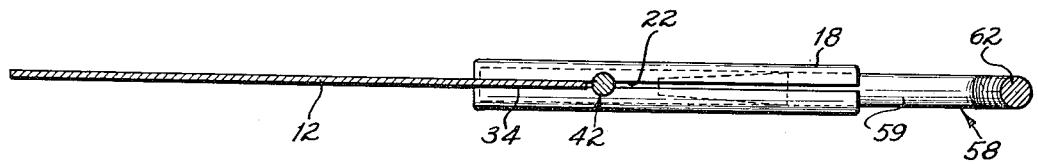
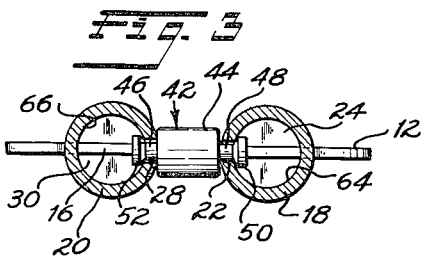
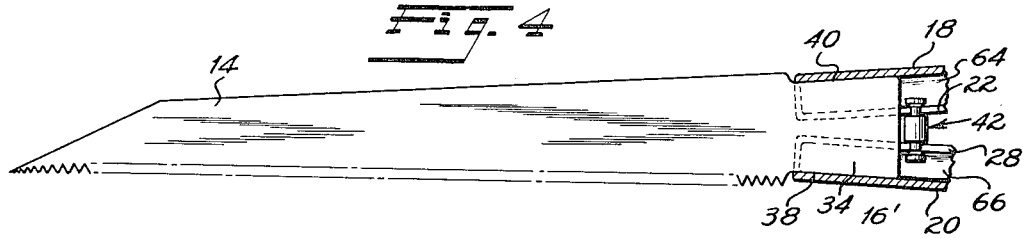
INVENTOR
JOHN P. YOUNG
BY  *Edwin A. Block*
ATTORNEY

United States Patent Office 2,752,207
Patented June 26, 1956

2,752,207
TOOL AND APPLIANCE HANDLE

John P. Young, Colton, Calif.

Application November 12, 1952, Serial No. 319,944

5 Claims. (Cl. 306—41)

The invention relates to a handle for tools and/or implements, and is particularly useful with that class of tools which may be provided in sets.

Various trades require a number of small hand tools such as putty knives of several sizes and types, and a painter usually has to buy a number of them.

It is an object of this invention to provide a handle for one or a group of tools or the like, the handle being characterized by its novel means of attachment to the shank of the tool and its facility of removal and connection.

A more specific object of the invention is to provide a releasable tool or implement handle that is neither complex nor expensive but yet retains its shank securely in confronting recesses of rockably connected side members, which members are forced against the shank of the blade very tightly.

A further object of the invention is to provide a handle for a group of blades or the like, having a pair of side members supplied with shank pockets, the pockets being forcibly closed upon the shank in response to the insertion of a wedging member in the outer ends of the side member, there being considerable mechanical advantage used in closing the pockets due to the location of fulcrum means disposed closer to the pocket than the point at which the wedge is inserted in the side members.

Other objects and features of importance will become apparent in following the description of the drawing, wherein:

Figure 1 is a plan view of the invention showing a putty knife blade used as the selected tool.

Figure 2 is a longitudinal sectional view taken on the line 2—2 of Figure 1 and in the direction of the arrows.

Figure 3 is an enlarged sectional view taken on the line 3—3 of Figure 1 and in the direction of the arrows.

Figure 4 is a fragmentary sectional view of the invention, showing its use with one other of a group of tools that the handle may releasably engage.

As indicated previously, the invention provides a handle adapted to hold the shank of any type of tool that is practical to use with such a handle. Sets consisting of putty knives, saws and other tools or implements, may be made up with a single handle 10 capable of being used with any one of the entire set, at the selection of the user. Figure 1 illustrates a putty knife blade 12, while Figure 4 shows a saw blade 14. However, each blade has an identical flat inwardly tapered shank 16 and 16', respectively, to fit in the pockets of handle 10.

Handle 10 consists of tubular or other shaped side members 18 and 20 respectively, member 18 having a longitudinal slot 22 extending from and through its inner closed end 24 to its outer open end 26. Similarly, side member 20 has a longitudinal slot 28 extending through its closed inner end 30 and to its outer open end 32. Slots 22 and 28 are in confronting relation (Figure 3) with each other and the inner ends thereof form a part of a pocket 34 to accommodate blade shank 16 or 16' or the blade shank of any other member of the wide variety of tools which may be used with the handle 10. Figure 4 shows that in the holding position of the handle walls 38 and 40 of members 18 and 20 are inclined and function as jaws in their holding actions respectively parallel to the tapered shank sides.

A pivot or fulcrum member 42 is disposed between side members 18 and 20, being of special construction. It has a center section 44 of greater diameter than the width of slots 22 and 28 so that the ends of the center section contact confronting surfaces of side members 18 and 20. Aligned trunnions 46 and 48 extend from the ends of center section 44, and they pass through slots 22 and 28. Heads 50 and 52 are provided at the ends of trunnions 46 and 48 and are disposed within the tubular side members 18 and 20, thereby preventing lateral separation of the side member.

Means are provided for spreading the outer ends of side members 18 and 20 and at the same time closing pockets 34 with a vise-like grip on one of the shanks, for example, shank 16'. The preferred wedging means consists of a generally U-shaped rod 58 having a relatively long leg 59 and a short leg 60 connected by an intermediate portion 62. Long leg 59 serves as a pilot when pushing the U-shaped rod into the bores 64 and 66 of side members 18 and 20 and through their open ends 26 and 32; that is long leg 59 enters its bore 64 before short leg 60 enters bore 66. To further facilitate insertion one edge 68 of leg 60 is beveled.

In operation, a tool, implement, blade or the like is selected, and its shank is inserted in pockets 34. This is easy to do, for without rod 58, side members 18 and 20 are freely rockable about pivot 42. Then, leg 59 is passed into bore 64 through open outer end 26 and leg 60 enters open end 32 of member 20, beveled edge 68 riding over the outer edge of a wall of bore 66. This, and the inclination of legs 59 and 60, spreads the outer ends of side members 18 and 20 causing them to rock on pivot 42 in a direction parallel to the trunnion axis. At the same time pockets 34 close tightly on the shank to firmly grip the same and preclude any movement of the shank with respect to the side members 18 and 20.

Due to the location of the pivot 42, that is, closer to pockets 34 than outer ends 26 and 32, considerable mechanical advantage is available by inserting U-shaped rod 58 into members 18 and 20. In addition, legs 59 and 60 are made of sufficient length that when fully inserted, parts thereof and the entire portion 62 remains exterior of the side members for a hand grip, either to remove rod 58 or to use the handle.

It is understood that modifications as fall within the scope of the following claims are protected by the claims.

What is claimed is:

1. A handle adapted to releasably engage a tool or implement shank, said handle comprising a pair of tubular side members, each member having an open outer end and a closed inner end, a longitudinal slot in its side wall opening through its inner end and forming a pocket to accommodate the shank, a rocking element provided with a center section contacting confronting surfaces of said side members, aligned trunnions extending from the ends of said center section and disposed in said slots, heads on the ends of said trunnions and disposed in said tubular side members thereby preventing said side members from being laterally separated from each other, and means inserted into the open ends of said side members thereby rocking the inner ends of said side members toward each other for pressing said pockets against the blade shank.

2. A handle adapted to releasably engage a tool or implement shank, said handle comprising a pair of tubular side members, each member having an open outer end and a closed inner end, a longitudinal slot in its side wall opening through its inner end and forming a pocket to accommodate the shank, a rocking element provided with a center section contacting confronting surfaces of said side member, aligned trunnions extending from the ends of said center section and disposed in said slots, heads on the ends of said trunnions and disposed in said tubular side members thereby preventing said side members from being laterally separated from each other, and means inserted into the open ends of said side members thereby rocking the inner ends of said side members toward each other for pressing said pockets against the blade shank, said means including a rod having legs angularly inclined toward each other and extending partially into said side members so that the remaining parts of the legs form a portion of the handle that may be grasped while using the handle.

3. The handle of claim 1, and, said rocking element being disposed closer to said pockets than said side member open ends so that a mechanical advantage is obtained when inserting said means into said side member outer ends.

4. A handle comprising a pair of separate laterally spaced side members, each member having a tool gripping portion at one end, a fulcrum member extending between and having an element at each end rockably engaging said side members, and means releasably engaging the other ends of said side members to rock the same about the fulcrum to detachably grip a tool.

5. A handle adapted to detachably grip an implement shank comprising a pair of tubular members mounted in parallel positions, said members having opposed end portions formed to grip a shank, an element extending between and having a head at each end rockably connected with each of said opposed tubular members, and an element slidably engaging the other ends of said tubular members to rock the latter and cause them to detachably grip the implement.

References Cited in the file of this patent

UNITED STATES PATENTS

| | | |
|---|---|---|
| 158,459 | Biglin | Jan. 5, 1875 |
| 609,967 | Ladd | Aug. 30, 1898 |

FOREIGN PATENTS

| | | |
|---|---|---|
| 178,018 | Germany | Nov. 8, 1906 |